(12) United States Patent  (10) Patent No.: US 8,662,364 B2
Vuillet  (45) Date of Patent: Mar. 4, 2014

(54) SYSTEM FOR ATTACHING THE REMOTE CONTROL OF AN ELECTRONIC CONTROL UNIT IN A MOTOR VEHICLE

(75) Inventor: Jean-Francois Vuillet, Versailles (FR)

(73) Assignee: Parrot, Paris (FR)

( * ) Notice: Subject to any disclaimer, the term of this patent is extended or adjusted under 35 U.S.C. 154(b) by 232 days.

(21) Appl. No.: 13/342,869

(22) Filed: Jan. 3, 2012

(65) Prior Publication Data
US 2012/0168477 A1    Jul. 5, 2012

(30) Foreign Application Priority Data

Jan. 4, 2011 (FR) ...................... 11 50054

(51) Int. Cl.
*B60R 7/04* (2006.01)
*B60R 7/06* (2006.01)

(52) U.S. Cl.
USPC ...................................... 224/276

(58) Field of Classification Search
USPC ......... 224/276, 483, 545, 555, 575, 576, 577, 224/584, 585, 929; 455/575.8, 575.9, 455/569.2; 248/218.4, 309.1, 310, 214, 248/215; 296/37.12; 206/320; 379/446, 379/449, 450, 454, 455
See application file for complete search history.

(56) References Cited

U.S. PATENT DOCUMENTS

| 6,760,569 | B1 | 7/2004 | Chen | |
|---|---|---|---|---|
| 7,456,777 | B2 * | 11/2008 | Piekarz | 341/176 |
| 8,348,112 | B2 * | 1/2013 | Becker | 224/547 |
| 2004/0204004 | A1 * | 10/2004 | Chen | 455/550.1 |
| 2012/0286118 | A1 * | 11/2012 | Richards | 248/299.1 |

FOREIGN PATENT DOCUMENTS

| DE | 19539396 A1 | 5/1996 |
|---|---|---|
| DE | 29910846 U1 | 9/1999 |
| EP | 1502835 A1 | 2/2005 |
| GB | 2424854 A | 11/2006 |

* cited by examiner

*Primary Examiner* — Adam Waggenspack
(74) *Attorney, Agent, or Firm* — Haverstock & Owens LLP

(57) ABSTRACT

The remote control (10) comprises: a cylindrical pad (11) for contact with the steering wheel (1); a first insert (12) extending parallel to the generatrices of the cylindrical pad at a first end of the pad; and a second insert (13) extending parallel to the generatrices of the cylindrical pad at a second end of the pad, opposite to the first end. A removable strap (20) makes it possible to attach the cylindrical contact pad to the steering wheel, and comprises a means (23) for fastening to the second insert, and a self-gripping face (201) adapted to be folded over itself around the first insert. A removable intermediate plate further makes it possible to attach the remote control to the dashboard instead of the steering wheel, and comprises for that purpose means for holding on the first insert and means for locking to the second insert.

14 Claims, 3 Drawing Sheets

SYSTEM FOR ATTACHING THE REMOTE CONTROL OF AN ELECTRONIC CONTROL UNIT IN A MOTOR VEHICLE

The invention relates to a system for attaching the remote control of an electronic control unit in a motor vehicle.

The invention finds a particularly advantageous application in the field of the audio control units intended, in particular, to provide the "hands-free" telephony and music listening functions in the motor vehicles.

Such control units are generally provided as aftermarket equipments in the motor vehicles to allow the user, the most often the vehicle's driver, to perform a phone call without having to handle the phone handset, and also to listen to music programs. Other functions such as a GPS satellite positioning system may be integrated in such control units.

Many controls are offered to the user to obtain an optimal use of the basic functions of the control unit, i.e. telephony and music listening. Among these controls, it can be mentioned: picking up/hanging up a phone call; using the "voice recognition" function; increasing/reducing the sound volume; skipping to the next or previous song, etc.

The electronic control unit itself is generally arranged on the dashboard, at a location that is often too far from the driver so that he/she can easily reach it without interfering with the drive. For that purpose the electronic control unit is added with a remote control located near the driver, intended to facilitate the access to the controls of the above-mentioned basic functions.

The remote control may be arranged on the front of the dashboard, or even on the steering wheel itself for offering an immediate accessibility of the controls while ensuring the drive security because, in this case, the driver does not need to let go of the steering wheel.

Such remote controls are known that can be attached to the steering wheel or to the dashboard of the vehicle. To attach the remote control to the steering wheel, an intermediate support has first to be installed on the steering wheel and then the remote control itself is clipped onto the support. Another adhesive intermediate support has to be used to attach the remote control to the dashboard.

Such known attaching systems have the drawback that they require an intermediate support to attach the remote control to the steering wheel. It results therefrom a bulky support+ remote control unit, liable to hamper the driver in his/her handling of the steering wheel. On the other hand, the mounting of the remote control on the steering wheel is not very easy because it requires the installation of an additional part consisted of the intermediate support.

One object of the invention is to propose a very compact system for attaching the remote control of an electronic control unit in a motor vehicle, in such a manner to minimize the space taken up on the steering wheel, limit the interference with the drive, increase the comfort of drive and ensure security.

On the other hand, the attaching system proposed has further to be versatile (possibility to be mounted indifferently on the steering wheel or on the dashboard) and easily detachable, with a minimum of parts to handle so that the remote control can be rapidly moved from the steering wheel to the dashboard, and vice versa.

This object is achieved, according to the invention, by the system comprising:

a cylindrical pad for contact with the steering-wheel, arranged on the remote control, a first insert extending parallel to the generatrices of the cylindrical pad at a first end of the pad;

a second insert extending parallel to the generatrices of the cylindrical pad at a second end of the pad, opposite to the first end;

a removable strap intended to attach the cylindrical contact pad to the steering wheel, the strap comprising a means for fastening to the second insert and a self-gripping face adapted to be folded over itself around the first insert; and an removable intermediate plate comprising means for attaching to the vehicle dashboard, means for holding on the first insert and means for locking to the second insert.

Therefore, as will be seen in details hereinafter, it is very simple to attach the remote control to the steering wheel thanks to the removable self-gripping strap that is placed around the steering wheel as a belt, the strap being moreover adapted to be rapidly mounted on the remote control and removed therefrom. Likewise, the remote control can be very easily placed on the plate, by being simply clipped onto it, with the plate being added on the dashboard by any attaching means, in particular adhesives.

It is understood that the cylindrical pad arranged on the remote control has a shape that makes it possible to offer the largest surface of contact with the steering wheel for a better hold of the remote control. Within that meaning, the invention provides that the contact pad is made of elastomer, for example rubber. Increased adherence to the steering wheel and good vibration absorption are thus obtained. Likewise, the adherence of the remote control to the steering wheel may be further improved by, according to the invention, the contact pad having corrugations.

Even when the remote control is mounted on the intermediate plate to be installed on the dashboard, the effect of the vibrations may be reduced if, as proposed by the invention, the intermediate plate comprises at least one anti-vibration bearing intended to come into abutment against the contact pad.

According to a particular embodiment of the invention, at least one insert is metallic. Such characteristic has the advantage, unlike the plastic materials for example, to obtain a rigid structure while keeping a low thickness, hence a smaller size and a discrete integration of the remote control in the environment of the passenger compartment of the vehicle.

According to an embodiment of the invention, the second insert has a locator for the fastening of the removable strap. Such arrangement aims to ensure that the strap is fastened on the remote control at the good position, i.e. that which permits the strap to be folded onto itself around the first insert, so that the two faces of the strap then becoming opposite to one another are self-gripping faces.

As regard the introduction of the remote control into the intermediate plate in order to attach it to the dashboard of the vehicle, it is provided by the invention that the holding means of the removable plate are consisted of a lip intended to receive the first insert, while the locking means of the removable plate are consisted of at least one flexible tab for clipping by elastic deformation onto the second insert. The introduction of the remote control into the plate is thus carried out very simply by firstly introducing the first insert into the lip of the plate, then by forcing the interspace between flexible tabs, by elastic deformation upon the passage of the second insert of the remote control, with the tabs closing back after the passage of the insert. To remove the remote control from the intermediate plate, it is just required to forcibly open the flexible tabs to release the second insert from the plate, and then the rest of the remote control.

Finally, the strap face opposite to the self-gripping face advantageously comprises a material adapted to increase the adherence with the surface of the steering wheel. This makes it possible, in combination with the cylindrical pad, to limit the force required to tighten the strap around the steering wheel.

An exemplary embodiment of the invention will now be described, with reference to the appended drawings in which the same reference numbers designate identical or functionally similar elements through the figures.

FIG. 1b is a cross-sectional view of the remote control of FIG. 1a.

FIG. 2 is a perspective view of a removable strap the remote control of FIGS. 1a and 1b is intended to be equipped with.

Figure 1A:
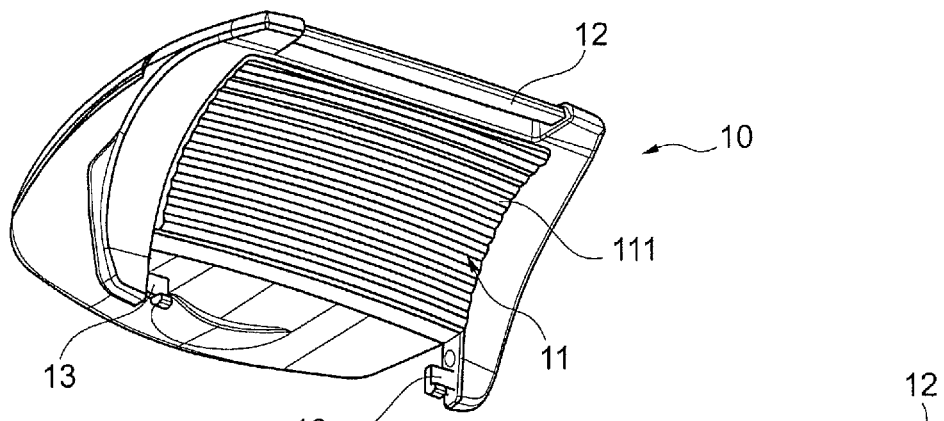
FIG. 1a is a perspective underside view of a remote control according to the invention.
Figure 1B:
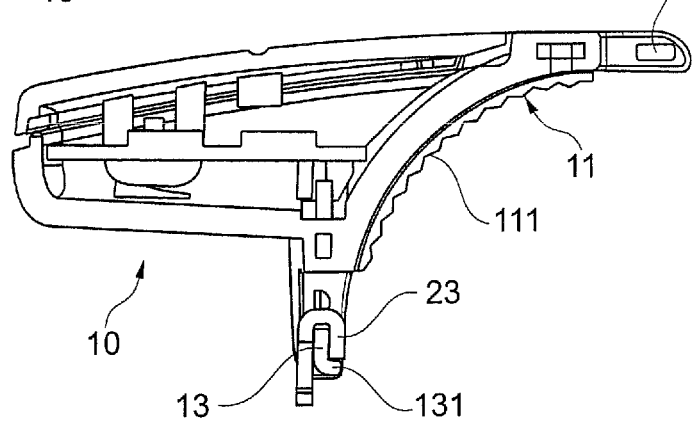

In FIGS. 1a and 1b is shown a remote control 10 intended to control a "hands-free" electronic control unit, not shown, by means of which the driver of a motor vehicle can emit or receive a phone call without having to handle a phone handset. Generally, such control unit also provides other applications of interest for the user, such as music listening or GPS positioning, for example. For that purpose, and as shown in FIG. 3, the remote control 10 comprises means adapted to activate, notably through Bluetooth link (Bluethooth is a registered trademark of Bluetooth SIG, Inc.), the remote control of basic functions associated with the applications provided by the electronic control unit, in particular telephony and music listening.

Figure 3:
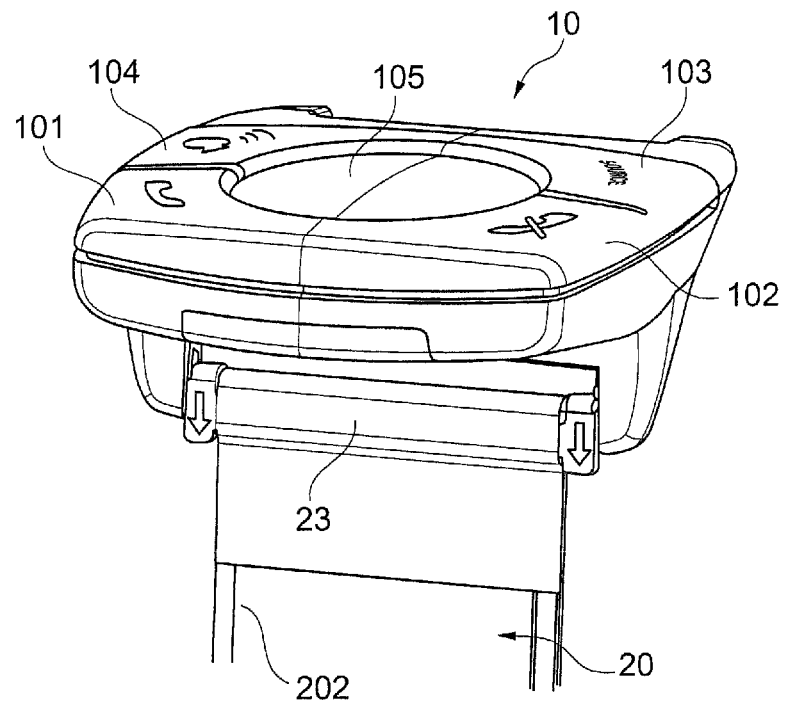
FIG. 3 is a perspective view of the remote control of FIGS. 1a and 1b, equipped with the strap of FIG. 2.
Figure 5:
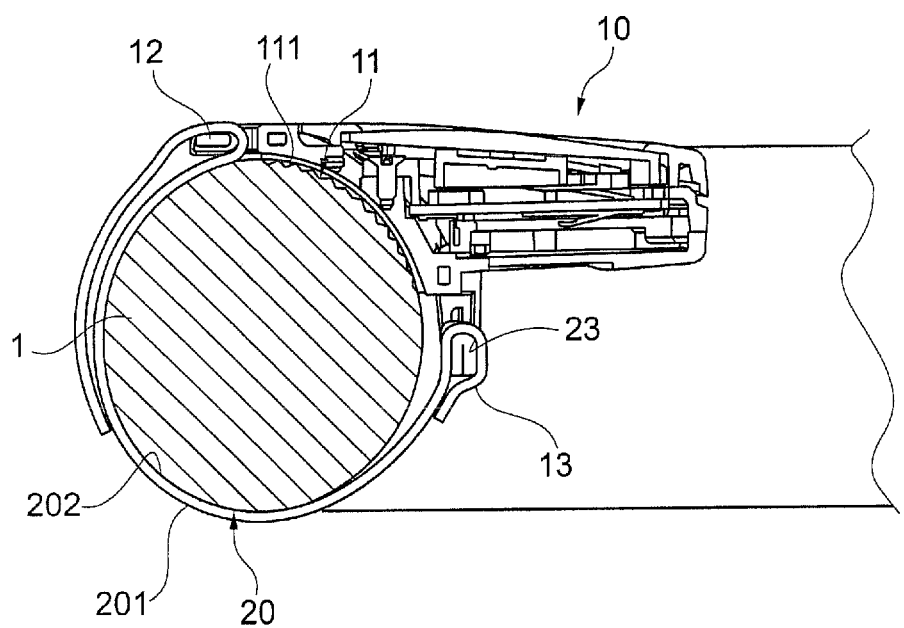
FIG. 5 is a cross-sectional view of the remote control of FIGS. 1a and 1b, attached to a steering wheel of a motor vehicle by means of the strap of FIG. 2.

The activation means illustrated in FIG. 3 are buttons 101, 102, 103, 104, 105 for controlling various functions such as: picking up/hanging up a phone call, using the voice recognition, starting or ending music listening, increasing or reducing the sound volume, etc.

The remote control 10 is designed to be attached indifferently to the steering wheel 1 or to the dashboard of the vehicle.

In order to obtain a versatile mode of attaching, a cylindrical pad 11 for contact with the steering wheel 1 of the vehicle is arranged on the body of the remote control 10, as can be seen in FIGS. 1a and 1b. The cylindrical shape of the pad 11 is chosen in order to envelop at best the cross-section of the steering wheel 1. The adherence between the pad 11 and the steering wheel 1 may be increased thanks to using elastomer, for example rubber, to make the pad 11, with the additional advantage of vibration damping. Likewise, corrugations 111 drawn on the pad 11 help to further improve the adherence of the pad 11 to the steering wheel 1.

In order to positively attach the remote control 10 to the steering wheel 1 through the cylindrical pad 11, a self-gripping strap 20 such as that shown in FIGS. 2, 3, 4 and 5 is used. Generally, the strap 20 acts as a belt, adapted to maintain the pad 11 stuck against the steering wheel 1 by tightly fitting the remote control 10 around the steering wheel, so that a self-gripping face 201 of the strap 20 is folded over itself around a first insert 12 arranged at a first end of the cylindrical pad 11, parallel to the generatrices of the latter.

The strap 20 is maintained by a mean 23 for fastening to a second insert 13 arranged at a second end of the cylindrical pad 11, opposite to the first end, parallel to the first insert 12. In the exemplary embodiment shown in FIGS. 2, 3, 4 and 5, the second insert is formed of two end hoods 13, while the fastening means 23 is made of a single longitudinal hook extending over the whole width of the strap 20. Of course, the second insert 13 could also be a single hook extending substantially over the whole width of the pad 11.

The inserts 12, 13 are preferably metallic to offer a better rigidity with a minimum thickness, compared to inserts that would be made of plastic material.

The smooth face 202 of the strap 20, in direct contact with the surface of the steering wheel 1 is formed of a material that makes it possible to increase the adherence with the surface of the steering wheel, for example a synthetic leather coating. The association of the rubber pad 11 and the strap thus makes possible to limit the force required for tightening the strap, and to have a contact surface that adheres over the almost-totality of the area of contact with the steering wheel.

Figure 4:
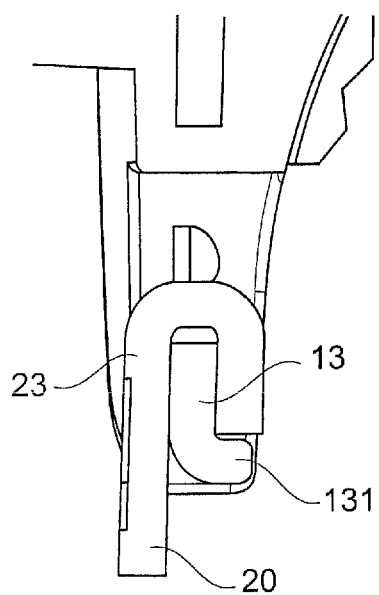
FIG. 4 is a detailed side view of a locator for the fastening of the strap of FIG. 2 onto the remote control of FIGS. 1a and 1b.
Figure 2:
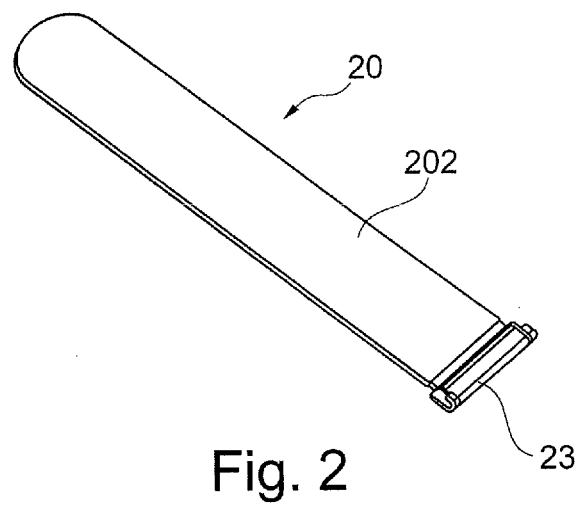

As it is very important that the strap 20 is placed in the direction permitting the self-gripping face 201 to fold over itself, the second insert is provided with a locator formed by a rounded edge 131 of the hooks 13, as shown in the detailed view of FIG. 4.

To detach the remote control 10 from the steering wheel 1 so as, for example, to place it on the dashboard of the vehicle, it is simply required to separate the two contacting strands of the self-gripping face 201, to release the strap 20 from the first insert 12 and to separate the fastening means 23 from the second insert 13.

Figure 6:
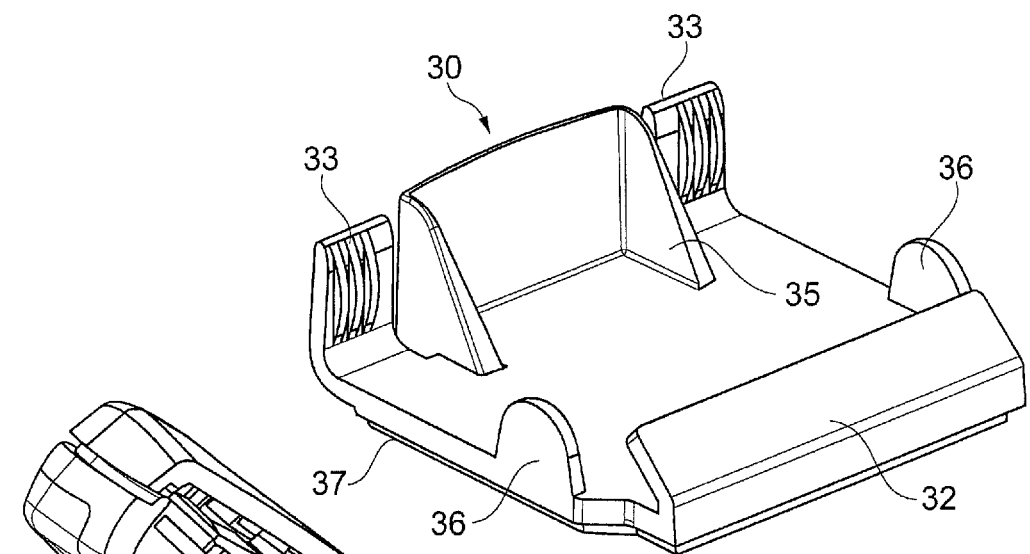
FIG. 6 is a perspective view of an intermediate plate for attaching the remote control of FIGS. 1a and 1b to the dashboard of a motor vehicle.
Figure 7:
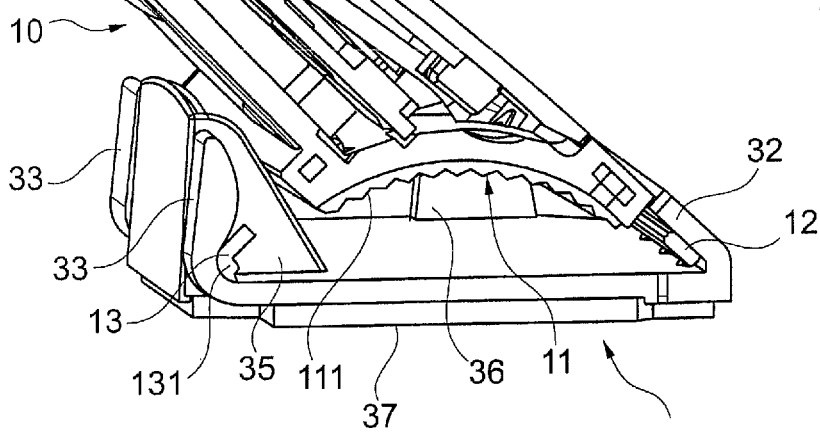
FIG. 7 is a perspective and cross-sectional view of the remote control of FIGS. 1a and 1b, mounted on the plate of FIG. 6.
Figure 8:
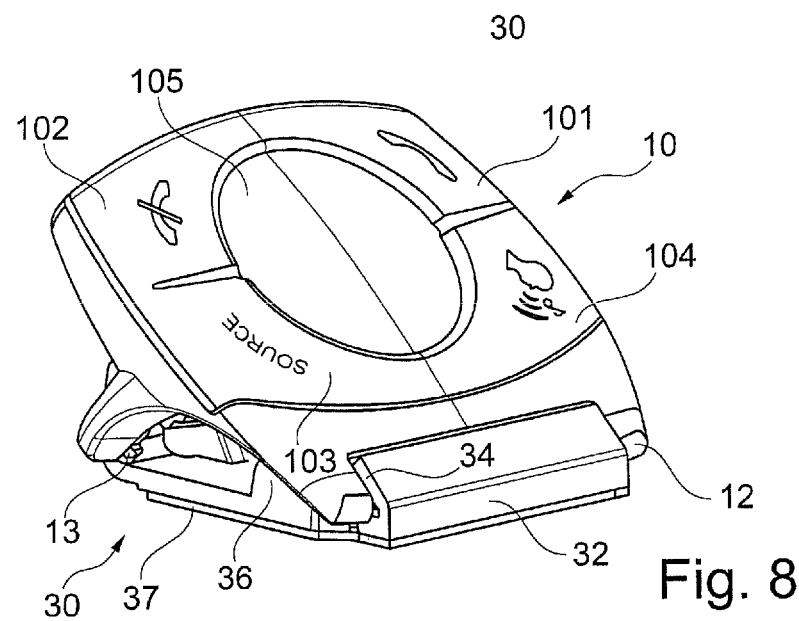
FIG. 8 is another perspective view of the remote control of FIGS. 1a and 1b, mounted on the plate of FIG. 6.

The installation of the remote control 10 on the dashboard requires a removable intermediate plate 30, shown in FIGS. 6, 7 and 8. Such plate 30 comprises, on the one hand, means for receiving the remote control 10 and, on the other hand, means for attaching to the dashboard.

The means for receiving the remote control 10 comprise a lip 32 for holding the first insert 12, and locking means consisted of two flexible tabs 33 for clipping by elastic deformation onto the second insert 13. In order to mount the remote control 10 in the intermediate plate 30, it is just required to engage the first insert 12 into the holding lip 32 and to deform the flexible tabs 33 by means of the second insert 13 until the tabs elastically close back after the passage of this latter. The rounded portion 131 of the hooks 13 acting as a locator allows a smooth sliding of the second insert over the tabs 33.

The removal of the remote control 10 from the plate 30 is made by the reverse operation, by lifting the remote control so as to force the flexible tabs to open by elastic deformation by means of the second insert and to allow the releasing of the latter.

The lip 32 of the plate 30 is held in position on the remote control 10 thanks to a fitting indentation 34 arranged on the remote control 10.

In FIG. 6 are shown ribs 35 for centering the plate 30 on the remote control 10. These ribs, by respectively resting against the end inserts 13, ensure a perfect positioning of the plate 30.

FIGS. 6, 7 and 8 show the presence on the plate 30 of anti-vibrations bearings 36 intended to come into abutment against the rubber pad 11, the latter being therefore capable of absorbing the vibrations, which improve the performance of the whole unit.

The means for fastening the plate 30 on the dashboard may be adhesive means applied on the contact surface 37 of the plate.

The invention claimed is:

1. A system for attaching the remote control of an electronic control unit in a motor vehicle, characterized in that it comprises:
  a remote control (10) comprising:
    a cylindrical pad (11) for contact with the steering wheel (1) of the vehicle, arranged on the remote control;
    a first insert (12) extending parallel to the generatrices of the cylindrical pad at a first end of the pad; and
    a second insert (13) extending parallel to the generatrices of the cylindrical pad at a second end of the pad, opposite to the first end;
  a removable strap (20) intended to attach the cylindrical contact pad on the steering-wheel, comprising:
    a means (23) for fastening to the second insert; and
    a self-gripping face (201) adapted to be folded over itself around the first insert; and
  a removable intermediate plate (30), comprising:
    means for attaching to the vehicle dashboard,
    means (32) for holding on the first insert, and
    means (33) for locking to the second insert.

2. The attaching system according to claim 1, wherein the contact pad is made of elastomer.

3. The attaching system according to claim 1, wherein the contact pad has corrugations (111).

4. The attaching system according to claim 1, wherein the intermediate plate has at least one anti-vibration bearing (36) intended to come into abutment against the contact pad.

5. The attaching system according to claim 1, wherein at least one of the inserts is metallic.

6. The attaching system according to claim 1, wherein the second insert has a locator (131) for the fastening of the removable strap.

7. The attaching system according to claim 6, wherein the locator consists of a rounded edge of the second insert.

8. The attaching system according to claim 1, wherein the second insert is formed by two end hooks.

9. The attaching system according to claim 8, wherein the removable plate comprises two centering ribs (35) intended to respectively come into abutment against the end hooks.

10. The attaching system according to claim 1, wherein the holding means of the removable plate are consisted of a lip (32) intended to receive the first insert.

11. The attaching system according to claim 10, wherein the remote control has an indentation (34) for the fitting of the holding lip.

12. The attaching system according to claim 1, wherein the locking means of the removable plate are consisted of at least one flexible tab (33) for clipping by elastic deformation onto the second insert.

13. The attaching system according to claim 1, wherein the attaching means of the removable plate are adhesive means.

14. The attaching system according to claim 1, wherein the strap face (202) opposite to the self-gripping face comprises a material adapted to increase the adherence with the surface of the steering wheel in order, in combination with the cylindrical pad (11), to limit the force required to tighten the strap around the steering wheel.

* * * * *